United States Patent
Carlson et al.

(10) Patent No.: US 8,084,980 B2
(45) Date of Patent: Dec. 27, 2011

(54) HVAC ACTUATOR WITH INTERNAL HEATING

(75) Inventors: Nathan Carlson, Maple Grove, MN (US); Miroslav Mikulica, Brno (CZ)

(73) Assignee: Honeywell International Inc., Morristown, NJ (US)

( * ) Notice: Subject to any disclaimer, the term of this patent is extended or adjusted under 35 U.S.C. 154(b) by 415 days.

(21) Appl. No.: 12/397,404

(22) Filed: Mar. 4, 2009

(65) Prior Publication Data

US 2010/0194326 A1    Aug. 5, 2010

Related U.S. Application Data

(60) Provisional application No. 61/148,836, filed on Jan. 30, 2009.

(51) Int. Cl.
*G05B 5/00* (2006.01)
*G05D 23/00* (2006.01)
*H02H 7/08* (2006.01)

(52) U.S. Cl. ............ 318/471; 318/436; 318/40; 318/159

(58) Field of Classification Search .............. 318/436, 318/40, 159, 471
See application file for complete search history.

(56) References Cited

U.S. PATENT DOCUMENTS

| | | | |
|---|---|---|---|
| 3,579,072 A | 5/1971 | Plummer | |
| 3,937,974 A | 2/1976 | Lafuze | |
| 3,959,702 A | 5/1976 | Godwin et al. | |
| 3,967,227 A | 6/1976 | Clarke et al. | |
| 3,974,427 A | 8/1976 | Carson | |
| 4,027,216 A | 5/1977 | Rozek | |
| 4,038,589 A | 7/1977 | Heyne et al. | |
| 4,139,807 A | 2/1979 | Hucker | |
| 4,177,716 A | 12/1979 | Bowe et al. | |
| 4,205,783 A | 6/1980 | Dietsche et al. | |
| 4,295,085 A | 10/1981 | Lafuze | |
| 4,311,950 A | 1/1982 | Goldin et al. | |
| 4,315,202 A | 2/1982 | Dawson et al. | |
| 4,337,821 A | 7/1982 | Saito | |
| 4,364,004 A | 12/1982 | Bourbeau | |
| 4,364,111 A | 12/1982 | Jocz | |
| 4,393,597 A | 7/1983 | Picard et al. | |
| 4,417,288 A | 11/1983 | Hattori et al. | |
| 4,422,028 A | 12/1983 | Godwin et al. | |
| 4,423,364 A | 12/1983 | Kompelien et al. | |
| 4,424,472 A | 1/1984 | Jacot-Descombes et al. | |
| 4,434,932 A | 3/1984 | Hara et al. | |

(Continued)

FOREIGN PATENT DOCUMENTS

EP    0847132    6/1998

(Continued)

OTHER PUBLICATIONS

"Current Loop Control of a Brushless DC Motor with Hall Sensors Using the ADMC401," Analog Devices Inc., 19 pages, Oct. 2001.

(Continued)

*Primary Examiner* — Walter Benson
*Assistant Examiner* — Erick Glass
(74) *Attorney, Agent, or Firm* — Seager, Tufte & Wickhem LLC (57) ABSTRACT

An HVAC actuator configured to function in cold environments by providing a supplemental current component to an HVAC actuator in order to generate supplemental heat to warm the HVAC actuator.

24 Claims, 7 Drawing Sheets

U.S. PATENT DOCUMENTS

| | | |
|---|---|---|
| 4,439,139 A | 3/1984 | Nelson et al. |
| 4,456,166 A | 6/1984 | Kagohata |
| 4,501,155 A | 2/1985 | Garritano |
| 4,530,395 A | 7/1985 | Parker et al. |
| 4,546,293 A | 10/1985 | Peterson et al. |
| 4,556,169 A | 12/1985 | Zervos |
| 4,572,333 A | 2/1986 | Westley |
| 4,591,773 A | 5/1986 | Numata |
| 4,591,774 A | 5/1986 | Ferris et al. |
| 4,591,775 A | 5/1986 | Nussel et al. |
| 4,608,527 A | 8/1986 | Glennon et al. |
| 4,613,798 A | 9/1986 | Baumann |
| 4,618,808 A | 10/1986 | Ish-Shalom et al. |
| 4,638,643 A * | 1/1987 | Sakazume et al. ............... 62/209 |
| 4,651,068 A | 3/1987 | Meshkat-Razavi |
| 4,656,410 A | 4/1987 | Shibata |
| 4,659,973 A | 4/1987 | Stich |
| 4,677,355 A | 6/1987 | Baumann |
| 4,701,839 A | 10/1987 | McNally et al. |
| 4,704,569 A | 11/1987 | Mallick, Jr. et al. |
| 4,720,792 A | 1/1988 | Kasai et al. |
| 4,751,438 A | 6/1988 | Markunas |
| 4,771,643 A | 9/1988 | Mott |
| 4,818,908 A | 4/1989 | Tamae et al. |
| 4,825,138 A | 4/1989 | Platzer et al. |
| 4,835,448 A | 5/1989 | Dishner et al. |
| 4,839,579 A | 6/1989 | Ito et al. |
| 4,841,202 A | 6/1989 | Dishner et al. |
| 4,888,533 A | 12/1989 | Gotoh et al. |
| 4,897,583 A | 1/1990 | Rees |
| 4,937,508 A | 6/1990 | Rozman |
| 4,939,441 A | 7/1990 | Dhyanchand |
| 4,949,021 A | 8/1990 | Rozman et al. |
| 5,029,263 A | 7/1991 | Rozman |
| 5,038,062 A | 8/1991 | Shiraki et al. |
| 5,047,681 A | 9/1991 | Gaillard et al. |
| 5,053,688 A | 10/1991 | Rees |
| 5,053,689 A | 10/1991 | Woodson et al. |
| 5,081,405 A | 1/1992 | Nelson |
| 5,087,866 A | 2/1992 | Smith |
| 5,096,156 A | 3/1992 | Wylie et al. |
| 5,097,189 A | 3/1992 | Ito et al. |
| 5,100,101 A | 3/1992 | Shah |
| 5,113,125 A | 5/1992 | Stacey |
| 5,131,623 A | 7/1992 | Giordani |
| 5,153,493 A | 10/1992 | Jornod et al. |
| 5,168,202 A | 12/1992 | Bradshaw et al. |
| 5,182,498 A | 1/1993 | Stuhr |
| 5,200,661 A | 4/1993 | Shramo et al. |
| 5,202,610 A | 4/1993 | Frye et al. |
| 5,274,315 A | 12/1993 | Finocchi et al. |
| 5,278,454 A | 1/1994 | Strauss et al. |
| 5,328,150 A | 7/1994 | Guativa |
| 5,363,025 A | 11/1994 | Colling |
| 5,384,527 A | 1/1995 | Rozman et al. |
| 5,406,186 A | 4/1995 | Fair |
| 5,416,397 A | 5/1995 | Mazzara et al. |
| 5,416,652 A | 5/1995 | Lewis |
| 5,420,492 A | 5/1995 | Sood et al. |
| 5,425,165 A | 6/1995 | Shramo et al. |
| 5,428,470 A | 6/1995 | Labriola, II |
| 5,430,362 A | 7/1995 | Carr et al. |
| 5,440,486 A | 8/1995 | Rudzewicz et al. |
| 5,449,986 A | 9/1995 | Dozor |
| 5,450,999 A | 9/1995 | Scholten et al. |
| 5,461,293 A | 10/1995 | Rozman et al. |
| 5,488,286 A | 1/1996 | Rozman et al. |
| 5,493,200 A | 2/1996 | Rozman et al. |
| 5,495,162 A | 2/1996 | Rozman et al. |
| 5,495,163 A | 2/1996 | Rozman et al. |
| 5,519,295 A | 5/1996 | Jatnicks |
| 5,519,546 A | 5/1996 | Lewis |
| 5,540,414 A | 7/1996 | Giordani et al. |
| 5,550,449 A | 8/1996 | Ege et al. |
| 5,565,750 A | 10/1996 | Padgett |
| 5,567,874 A | 10/1996 | Suzuki |
| 5,587,641 A | 12/1996 | Rozman |
| 5,594,322 A | 1/1997 | Rozman et al. |
| 5,617,001 A | 4/1997 | Nacwicz et al. |
| 5,619,085 A | 4/1997 | Shramo |
| 5,635,809 A | 6/1997 | Ganser et al. |
| 5,656,911 A | 8/1997 | Nakayama et al. |
| 5,677,605 A | 10/1997 | Cambier et al. |
| 5,710,498 A | 1/1998 | Yutkowitz et al. |
| 5,710,755 A | 1/1998 | Chen |
| 5,723,918 A | 3/1998 | Schilling et al. |
| 5,740,880 A | 4/1998 | Miller |
| 5,760,707 A | 6/1998 | Katagiri |
| 5,767,643 A | 6/1998 | Pham et al. |
| 5,777,447 A | 7/1998 | Okano |
| 5,793,180 A | 8/1998 | Maiocchi et al. |
| 5,796,194 A | 8/1998 | Archer et al. |
| 5,798,596 A | 8/1998 | Lordo |
| 5,804,696 A | 9/1998 | Seberger |
| 5,814,962 A | 9/1998 | Mizumoto |
| 5,835,302 A | 11/1998 | Fuches et al. |
| 5,850,130 A | 12/1998 | Fujisaki et al. |
| 5,859,518 A | 1/1999 | Vitunic |
| 5,872,434 A | 2/1999 | Hill |
| 5,874,796 A | 2/1999 | Petersen |
| 5,912,542 A | 6/1999 | Zalesski |
| 5,912,543 A | 6/1999 | Mahr et al. |
| 5,923,728 A | 7/1999 | Ikkai et al. |
| 5,964,455 A | 10/1999 | Catanzarite et al. |
| 5,986,369 A | 11/1999 | Hanley et al. |
| 5,986,419 A | 11/1999 | Archer et al. |
| 5,990,643 A | 11/1999 | Holling et al. |
| 5,995,710 A | 11/1999 | Holling et al. |
| 6,002,234 A | 12/1999 | Ohm et al. |
| 6,049,194 A | 4/2000 | Nakagawa et al. |
| 6,051,948 A | 4/2000 | Vepy |
| 6,058,726 A | 5/2000 | Noritake |
| 6,075,332 A | 6/2000 | McCann |
| 6,076,368 A | 6/2000 | Noble |
| 6,078,158 A | 6/2000 | Heeren et al. |
| 6,100,655 A | 8/2000 | McIntosh |
| 6,114,827 A | 9/2000 | Alvaro |
| 6,181,091 B1 | 1/2001 | Heeren et al. |
| 6,184,604 B1 | 2/2001 | Takano et al. |
| 6,222,333 B1 | 4/2001 | Garnett et al. |
| 6,236,179 B1 | 5/2001 | Lawler et al. |
| 6,244,564 B1 | 6/2001 | Noritake |
| 6,246,232 B1 | 6/2001 | Okumura |
| 6,249,100 B1 | 6/2001 | Lange |
| 6,250,323 B1 | 6/2001 | Genga et al. |
| 6,271,641 B1 | 8/2001 | Yasohara et al. |
| 6,279,374 B1 | 8/2001 | Irokawa et al. |
| 6,307,336 B1 | 10/2001 | Goff et al. |
| 6,310,450 B1 | 10/2001 | Arrigo |
| 6,313,601 B1 | 11/2001 | Kubo et al. |
| 6,318,966 B1 | 11/2001 | Madara et al. |
| 6,324,085 B2 | 11/2001 | Kimura et al. |
| 6,367,337 B1 | 4/2002 | Schlabach |
| 6,369,540 B1 | 4/2002 | Lange et al. |
| 6,373,207 B1 | 4/2002 | Yablonvich |
| 6,373,211 B1 | 4/2002 | Henry et al. |
| 6,407,524 B1 | 6/2002 | Endo et al. |
| 6,495,981 B2 | 12/2002 | Romanowich et al. |
| 6,508,072 B1 | 1/2003 | Kanzawa et al. |
| 6,524,209 B2 | 2/2003 | Ito et al. |
| 6,548,981 B1 | 4/2003 | Ishii et al. |
| 6,549,871 B1 | 4/2003 | Mir et al. |
| 6,577,097 B2 | 6/2003 | Krefta et al. |
| 6,577,978 B1 | 6/2003 | Annan et al. |
| 6,580,235 B2 | 6/2003 | Laurent |
| 6,593,716 B1 | 7/2003 | Lange et al. |
| 6,605,912 B1 | 8/2003 | Bharadwaj et al. |
| 6,626,002 B1 | 9/2003 | Notohara et al. |
| 6,631,781 B2 | 10/2003 | Williams et al. |
| 6,647,329 B2 | 11/2003 | Kleinau et al. |
| 6,655,652 B2 | 12/2003 | Meinhof |
| 6,683,427 B2 | 1/2004 | Desbiolles et al. |
| 6,686,713 B2 | 2/2004 | Desbiolles et al. |
| 6,694,287 B2 | 2/2004 | Mir et al. |
| 6,732,438 B2 | 5/2004 | Enzinna |
| 6,741,048 B2 | 5/2004 | Desbiolles et al. |
| 6,791,219 B1 | 9/2004 | Eric et al. |

| | | | |
|---|---|---|---|
| 6,798,635 B2 | 9/2004 | Olsson | |
| 6,801,011 B2 | 10/2004 | Ide | |
| 6,812,667 B2 | 11/2004 | Yasohara et al. | |
| 6,826,499 B2 | 11/2004 | Colosky et al. | |
| 6,828,752 B2 | 12/2004 | Nakatsugawa et al. | |
| 6,828,919 B1 | 12/2004 | Gold | |
| 6,900,607 B2 | 5/2005 | Kleinau et al. | |
| 6,900,613 B2 | 5/2005 | Hirono | |
| 6,911,794 B2 | 6/2005 | Maslov et al. | |
| 6,914,399 B2 | 7/2005 | Kushion et al. | |
| 6,954,044 B2 | 10/2005 | McMillian et al. | |
| 6,979,965 B2 | 12/2005 | McMillian et al. | |
| 7,021,072 B2 | 4/2006 | McMillian et al. | |
| 7,188,481 B2 | 3/2007 | DeYoe et al. | |
| 7,265,512 B2 | 9/2007 | McMillan et al. | |
| 7,446,494 B2 | 11/2008 | Grabinger et al. | |
| 7,477,028 B2 * | 1/2009 | Bokusky et al. | 318/273 |

FOREIGN PATENT DOCUMENTS

| | | |
|---|---|---|
| EP | 1271071 | 1/2003 |
| JP | 2003322395 | 11/2003 |
| WO | WO 01/90621 | 11/2001 |

OTHER PUBLICATIONS

"SimpleServo Technical Section," 19 pages, prior to filing date of present application.

Belimo, Model AF24-SR US, Product Information Sheets, pp. 14-15, May 2002.

Evans, "The Three Phase Induction Motor," 6 pages, prior to Apr. 24, 2003.

http://en.wikipedia.org/wiki/Brushless_Motor, "Brushless DC Electric Motor," Wikipedia, the Free Encyclopedia, 2 pages, printed Aug. 4, 2005.

http://www.drbrushless.com/articles/advuni/, "Advanced Unipolar PWM Technique," 2 pages, printed Aug. 12, 2005.

http://www.drbrushless.com/articles/dcbctheory/, "DC Brushless Commutation Theory Basics," 1 page, printed Aug. 12, 2005.

http://www.drbrushless.com/articles/smartini/, "Smart Position Initialization Procedure for Sinusoidal Brushless Motor with Incremental Encoder with Hall Sensors in the Presence of Load Torque," 3 pages, printed Aug. 12, 2005.

http://www.e-insite.net/ednmag/index.asp?, "Circuit Forms DC-Motor Switch with Brake," 2 pages, printed Mar. 13, 2003.

http://www.industrialtechnology.co.uk/1998/oct/siemens.html, "Electric Braking Techniques," 2 pages, printed Mar. 13, 2003.

Kele Solutions, Siemens Spring Return Direct Coupled Actuators GMA, GCA Series, Product Information Sheets, 2 pages, Dec. 2001.

Morgan, "Spectra Motor Rotation Control," 5 pages, Feb. 24, 2003.

* cited by examiner

HVAC ACTUATOR WITH INTERNAL HEATING

PRIORITY

This application claims priority under 35 U.S.C. §119 to U.S. Provisional Application Ser. No. 61/148,836 entitled "HVAC ACTUATOR WITH INTERNAL HEATING" filed Jan. 30, 2009, the entirety of which is incorporated herein by reference.

TECHNICAL FIELD

The disclosure relates generally to HVAC actuators.

BACKGROUND

HVAC actuators are used in a wide variety of applications, including but not limited to air dampers, water valves and the like. Typically, an HVAC actuator has a motor that drives a drive train. The drive train often functions as a sort of transmission, turning a low torque, high speed motor output into a high torque, low speed drive train output that is sufficient to open an air damper, a water valve, or the like. In some cases, the motor may be configured to drive the drive train in a first direction to, for example, open an HVAC component and may drive the drive train in a second direction to, for example, close the HVAC component. Such actuators may be rotary, linear or move in some other fashion, depending on the application.

In some cases, an HVAC actuator such as a spring return actuator may have one or more return springs or other bias mechanism that opposes a driving direction of the motor. For example, a spring return actuator may be configured such that the motor drives an HVAC component (e.g. damper) from a closed position to an open position, while a return spring drives the HVAC component from the open position to the closed position. In other cases, a spring return actuator may be configured such that the motor drives an HVAC component from an open position to a closed position, while the return spring or other bias mechanism drives the HVAC component from the closed position to the open position.

HVAC actuators may be used in a variety of environments, and thus may potentially be exposed to large temperature swings. It will be appreciated that in cool environments, frictional forces within the HVAC actuator may increase relative to frictional forces experienced in warmer environments. In some cases, lubricants become more viscous (thicker) at lower temperatures and/or tolerances such as in the bearings may become tighter. As a result, the motor within the HVAC actuator may need additional power to overcome these temperature-related effects. Also, in a spring return actuator, the return spring (or springs) may need to be able to overcome the increased motor resistance. These factors can combine to often increase the package size, product cost and power consumption of an HVAC actuator.

In one example, assume that a particular HVAC actuator has, at room temperature, a power consumption rating of about 5.5 VA. In a cold environment, the same HVAC actuator may have a power consumption of about 6.5 VA because of increased resistances within the HVAC actuator due to the cold temperatures. It will be appreciated that this represents an increase in power consumption of about 18 percent. In another example, assume that a particular spring return actuator has, at room temperature, a back drive motor resistance of 0.1 N·m (Newton·meters) requiring a load of 2 N·m further up the drive train in order to close the device. In a cold environment, the back drive motor resistance may increase to 0.25 N·m, requiring a load of 5 N·m in order to close the device. It can be seen that this would require a stronger or more robust HVAC actuator design, which may include a stronger drive motor, stronger gearing, stronger housing and the like. This can add significant cost.

SUMMARY

The disclosure relates generally to HVAC actuators for driving HVAC components. An illustrative but non-limiting example of the disclosure may be found in an HVAC actuator that includes a drive train that is configured to drive an HVAC component along a range of motion from a first HVAC component position to a second HVAC component position via a motor that is coupled to the drive train for driving the drive train and thus the HVAC component. The HVAC actuator may include a controller for controlling the motor to move the HVAC component from the first HVAC component position to the second HVAC component position. In some cases, the controller may be configured to detect a selected condition, such as a low temperature condition, and in response may apply a supplemental current component to the motor that warms the HVAC actuator without substantially moving the HVAC component.

Another illustrative but non-limiting example of the disclosure may be found in a spring return HVAC actuator for driving an HVAC component. The spring return HVAC actuator may include a motor, a drive train that is driven by the motor and a return spring. While a return spring is used here as an example, it is contemplated that any suitable bias mechanism may be used. The drive train may be configured to drive the HVAC component in a first direction toward a first HVAC component position along a range of motion. The return spring may be configured to drive the HVAC component in a second, opposing direction. The spring return HVAC actuator may include a controller that is configured to operate the motor in order to drive the HVAC component in the first direction. In some cases, a thermal monitor may be provided for detecting a temperature of the HVAC actuator and provide the controller with a signal representing the HVAC actuator temperature. The controller may also be configured to apply a supplemental current component to the motor or other component (e.g. resistors, heating elements, etc.) of the HVAC actuator to warm the HVAC actuator without substantially moving the HVAC component.

Another illustrative but non-limiting example of the disclosure may be found in an HVAC actuator for driving an HVAC component that includes a motor and a drive train driven by the motor. The drive train may be configured to drive the HVAC component along a range of motion. A controller may be configured to operate the motor in order to drive the HVAC component in a first direction to open the HVAC component and in a second direction to close the HVAC component. In some cases, the HVAC actuator may include a thermal monitor that detects a temperature of the HVAC actuator and provides the controller with a signal representing the HVAC actuator temperature. The controller may be configured to actuate the motor without significantly driving the HVAC component if the HVAC actuator temperature is low in order to warm the HVAC actuator.

The above summary is not intended to describe each and every disclosed embodiment or every implementation of the disclosure. The Description that follows more particularly exemplify the various illustrative embodiments.

BRIEF DESCRIPTION OF THE FIGURES

The following description should be read with reference to the drawings. The drawings, which are not necessarily to scale, depict selected embodiments and are not intended to limit the scope of the disclosure. The disclosure may be more completely understood in consideration of the following detailed description of various embodiments in connection with the accompanying drawings, in which.

While the invention is amenable to various modifications and alternative forms, specifics thereof have been shown by way of example in the drawings and will be described in detail. It should be understood, however, that the intention is not to limit the invention to the particular illustrative embodiments described. On the contrary, the intention is to cover all modifications, equivalents, and alternatives falling within the spirit and scope of the invention.

DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

The disclosure relates generally to HVAC component actuators. While an HVAC component actuator may be a spring return actuator, it will be appreciated that in some cases, the HVAC component actuator may include some other biasing mechanism, or may not include a return spring or other biasing structure or mechanism at all. For example, and in some instances, the HVAC component actuator may use a motor to drive an HVAC component in both directions, rather than using a motor to drive in a first direction and a return spring or other biasing structure to drive the HVAC component in a second direction. In some cases, a spring return HVAC actuator may utilize the motor as a brake to limit travel speed when the return spring or other biasing structure is driving the HVAC component in the second direction. In some cases, an HVAC component actuator may include an on-board power supply such as a battery or capacitor that can be used as a fail-safe in powering the motor long enough to drive an HVAC component to a desired position in the case of a power failure, but this is not required in all embodiments.

Figure 1:
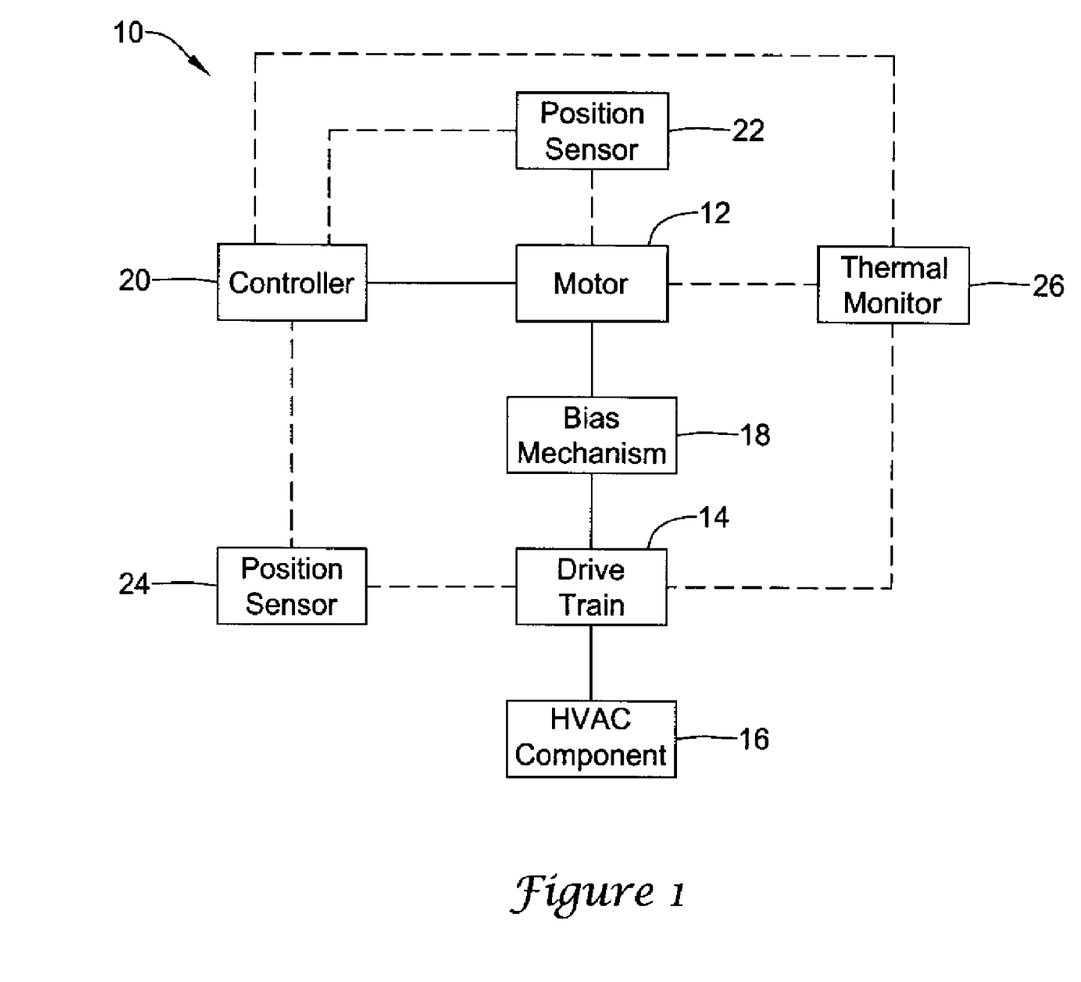
FIG. 1 is a schematic view of an illustrative but non-limiting HVAC actuator.

FIG. 1 shows an illustrative but non-limiting example of an HVAC actuator 10. As illustrated, HVAC actuator 10 is a spring return actuator but it will be appreciated that HVAC actuator 10 is not to be considered as being limited to a spring return actuator. HVAC actuator 10 includes a motor 12. It is contemplated that motor 12 may be a DC motor, an AC motor, a stepper motor, or any other suitable type of motor, as desired. In some instances, motor 12 is a brushless DC motor, but this is not required. The torque output of motor 12 may be adjustable by, for example, altering the current (and/or voltage) that is applied to motor 12. Likewise, the maximum output torque of the motor 12 may be set by limiting or clipping the current (and/or voltage) that is applied to motor 12.

In the illustrative embodiment, motor 12 may engage with a drive train 14. In some cases, drive train 14 may function as a kind of transmission, taking a relatively high speed, low torque output from motor 12 and turning it into a relatively low speed, high torque output that is suitable for driving an HVAC component 16 between two or more positions. HVAC component 16 may be, for example, an air damper, a fluid valve such as a ball valve, or the like. In some instances, the particular gearing present within drive train 14 may be customized to provide an appropriate balance of speed and torque, depending on the physical characteristics and/or requirements of the corresponding HVAC component 16. It will be appreciated, for example, that the torque necessary to open and/or close an air damper may be quite different than the torque needed to open and/or close a liquid valve such as a ball valve. In some cases, the drive train 14 may be configured to have an appropriate speed reduction and thus provide an appropriate level of torque. For example, drive train 14 may provide a speed reduction of about 1000:1, about 2000:1, about 3000:1 or any other suitable speed reduction as desired. It is contemplated that the HVAC actuator 10 may be a rotary, linear or any other suitable HVAC actuator, depending on the application.

In some instances, HVAC actuator 10 may include a bias mechanism 18 such as a return spring. As noted above, in some situations motor 12 may instead be used to drive HVAC component 16 in a first direction to, for example, open HVAC component 16 and to drive HVAC component 16 in a second direction to, for example, close HVAC component 16. If motor 12 is used in this manner, bias mechanism 18 may be made smaller, or may even be absent.

While bias mechanism is schematically illustrated as being disposed between motor 12 and drive train 14, it will be appreciated that this is not necessary. In some cases, for example, bias mechanism 18 may instead be disposed between drive train 14 and HVAC component 16, between HVAC component 16 and a fixed bracket or duct, or at any other suitable location. Bias mechanism 18, if present, may be any suitable structure that can provide a bias force that opposes at least one driving direction of motor 12. In some cases, bias mechanism 18 may be a resilient material such as a rubber, a gas cylinder, a hydraulic component, or the like. In some instances, bias mechanism 18 may be one or more return springs. If, for example, motor 12 drives HVAC component 16 in a first direction, bias mechanism 18 may drive HVAC component 16 in an opposing direction. In some cases, motor 12 may provide a braking effect while bias mechanism 18 drives HVAC component 16 in the opposing direction.

In some cases, HVAC actuator 10 may include a controller 20. Controller 20 may, for example, monitor and/or adjust the speed and/or torque of motor 12. In some cases, HVAC actuator 10 may include one or more sensors that are in communication with controller 20 to provide controller 20 with information pertaining to the speed of motor 12 and/or the relative position of motor 12, drive train 14 and/or HVAC component 16. It will be appreciated that in some instances, one or more of controller 20 and any sensors may be disposed on or in electrical communication with a printed circuit board (not illustrated) disposed within or proximate to HVAC actuator 10.

In some illustrative embodiments, HVAC actuator 10 may include a first position sensor 22 that is disposed proximate to motor 12 and that is in communication with controller 20, as well as a second position sensor 24 that is disposed proximate to drive train 14 and that is in communication with controller 20. HVAC actuator 10 may include both first position sensor 22 and second position sensor 24. In some cases, one or both of the position sensors may be omitted or perhaps replaced with any other desired type of position or speed sensor, as desired. When provided, it is contemplated that an optical encoder, potentiometer, hall effect sensor or any other suitable position sensor may be used, as desired.

In some cases, the first position sensor 22 may be a sensor that outputs a signal related to motor rotation. For example, first position sensor 22 may be a Hall sensor that outputs an incremental signal that represents motor rotations, although other types of sensors may be used. Second position sensor 24 may be a position potentiometer sensor, but this is not required. In some instances, such as if first position sensor 22 is a Hall sensor, there may be a known relationship between Hall counts and motor rotation that can be used to ascertain how many rotations motor 12 has undergone, and thus determine a position of drive train 14. Controller 20 may rely upon both sensors, or may, in some cases, operate in accordance with a signal from first position sensor 22 as long as it is in relative agreement with a signal from second position sensor 24. In some cases, neither position sensors 22 or 24 may be used.

In some instances, drive train 14 may have an output shaft or gear that drives the HVAC component 16. The output shaft or gear may be considered as rotating through a range of motion. In some instances, the range of motion may be defined not in terms of the rotation of the output shaft, but rather in terms of the rotation or other movement of HVAC component 16 in response to the rotating output shaft or gear. In some cases, the range of motion may be defined as the path traveled (either via the output shaft or HVAC component 16) between end points.

Figure 2:
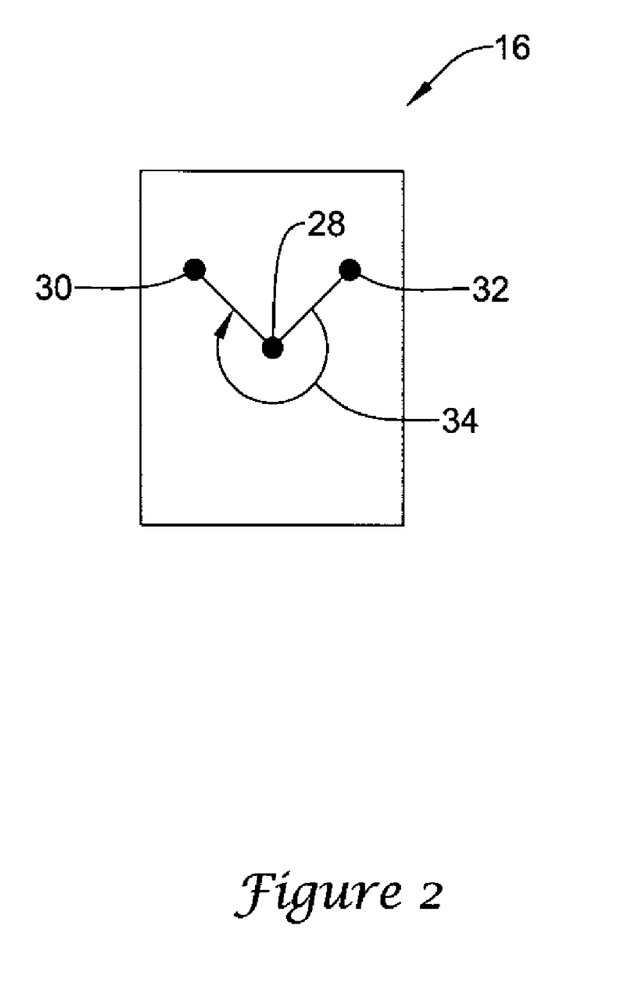
FIG. 2 is a schematic view of an illustrative HVAC component that may be actuated via the HVAC actuator of FIG. 1.

Turning briefly to FIG. 2, an illustrative HVAC component 16 is schematically shown as having a shaft 28 that may, for example, be driven by drive train 14 (FIG. 1) and may be connected to whatever portion of HVAC component 16 that is to be opened or closed. If HVAC component 16 is an air damper, shaft 28 may be connected to the damper itself. If HVAC component 16 is a fluid valve such as a ball valve, shaft 28 may engage the ball valve ball itself. The illustrative HVAC component 16 is seen as including a first end point 30 and a second end point 32, with a range of motion 34 defined therebetween. In some cases, first end point 30 and/or second end point 32 may represent mechanical limits of drive train 14 (FIG. 1) or the HVAC component 16. In some instances, first end point 30 and/or second end point 32 may be adjustable end points that may, for example, be set by an installer to prevent damage or set other limits to particular aspects or portions of HVAC component 16.

Returning back to FIG. 1, and in some cases, HVAC actuator 10 may include a thermal monitor 26, but this is not required. Thermal monitor 26 may provide a signal to controller 20 that is at least representative of a temperature of HVAC actuator 10. Thermal monitor 26 may be located in any particular position within (or near) HVAC actuator 10, as long as thermal monitor 26 is able to detect a temperature within or around HVAC actuator 10. In some instances, thermal monitor 26 may be disposed next to, inside, or near motor 12. In some cases, thermal monitor 26 may be positioned next to or near drive train 14. In some cases, thermal monitor 26 may be disposed on the aforementioned printed circuit board. In some cases, multiple thermal monitors 26 may be provided at different locations within the HVAC actuator 10, if desired.

Thermal monitor 26 may include or be any structure or device capable of detecting a temperature and providing a signal to controller 20 that represents the detected temperature. For example, thermal monitor 26 may be an electronic thermometer. In some cases, thermal monitor 26 may be a thermistor having a known resistance versus temperature curve. In some embodiments, the thermistor may be mounted on the aforementioned printed circuit board and controller 20 may monitor a voltage provided by the thermistor, which in turn may be evaluated by controller 20 as being representative of a detected temperature.

In some instances, controller 20 may be programmed or otherwise be configured to operate motor 12 in such a way as to use motor 12 to at least partially heat the motor and/or other components of the HVAC actuator 10, particularly if HVAC actuator 10 is used within a cold environment. In some instances, it is contemplated that HVAC actuator 10 may include a resistive element (not illustrated) that could be used to warm HVAC actuator 10 if a low temperature is detected. In some cases, the resistive element may be the coils of the motor 12, or some other resistor within the HVAC actuator. In some cases, HVAC actuator 10 may be warmed by inefficiently operating the motor or other elements in the HVAC actuator, if desired.

In some cases, it is contemplated that HVAC actuator 10 may not include thermal monitor 26. If controller 20 does not have an indication of HVAC actuator temperature, or perhaps if thermal monitor 26 malfunctions, controller 20 may assume a low temperature and may maintain a motor heating routine at all times. In some cases, it is contemplated that controller 20 may ascertain a measure of the environmental temperature and/or a temperature of the HVAC actuator itself by monitoring the current draw of motor 12. If HVAC actuator 10 is too cold, motor 12 may tend to draw relatively more current to move a particular distance (indicated for example by motor hall counts) than if motor 12 is in a warmer environment. In this instance, controller 20 may use motor current draw as an indicator of temperature.

When a thermal monitor 26 may provide controller 20 with an indication that HVAC actuator 10 is at a temperature that is considered too low for efficient operation (e.g. below a threshold temperature), controller 20 may operate motor 12 in a manner that will help to warm all or part of HVAC actuator 10. In an illustrative but non-limiting example, if HVAC actuator 10 is in an environment that allows HVAC actuator 10 to reach a temperature of −40° F., controller 20 may operate motor 12 or some other component of HVAC actuator to warm HVAC actuator 10 to a temperature of −15° F. It will be appreciated that these numbers are to be considered as merely illustrative.

In some cases, controller 20 may operate a motor heating routine in a binary, ON/OFF manner, i.e., if the temperature is below a predetermined level, the motor heating routine is initiated, and if the temperature is above the same or different predetermined level, the motor heating routine may be stopped. In some instances, however, controller 20 may operate a motor heating routine in a analog manner. That is, in some instances, it is contemplated that the level of heating achieved via a motor heating routine may be at least partially a function of the motor and/or actuator temperature. The function may be linear, non-linear, step or any other suitable function, as desired.

In some cases, controller 20 may use the motor 12 to warm HVAC actuator 10. For example, controller 20 may operate motor 12 in a less than optimal manner (e.g. less electrically efficient manner) while driving HVAC component 16. For example, by permitting motor 12 to draw excess current as a result of being driven inefficiently (e.g. out of phase), motor 12 may create additional thermal energy that will heat HVAC actuator 10.

In some cases, controller 12 may use motor 12 to warm HVAC actuator 10 only when HVAC actuator 10 is in a holding mode. A holding mode may be entered or defined as anytime that HVAC actuator 10 is not actively moving HVAC component 16. This would include periods of time in which no or essentially no current would normally be provided to motor 12, i.e., HVAC actuator 10 is in a rest position. In some cases, a current may be provided to motor 12 in order to counteract an opposing force provided by bias mechanism 18 (if provided) and thus hold HVAC component 16 in a stationary position. A holding mode may also include periods of time in which HVAC actuator 10 is holding HVAC component 16 in a position that is offset from a rest position, and possibly against the force of a biasing mechanism. These conditions may, for example, be known or detected by controller 20.

In some instances, a holding mode may be known or detected by controller 20 by knowing or determining the relative position of drive train 14. For example, if position sensor 22 is a Hall sensor and position sensor 24 is a position potentiometer, controller 20 may be programmed or otherwise provided with a known relationship between motor hall count and the rotational position of an output of drive train 14 (and hence the position of HVAC component 16). To illustrate, for a particular HVAC actuator 10, a motor hall count of about 56,500 may correspond to an output (of drive train 14) position of about 95 degrees. Thus, the motor hall count may be used by controller 20 to determine if HVAC actuator 10 is in a position that corresponds to a particular holding mode position. In some instances, controller 20 may recognize other positions for HVAC component 16 as also qualifying as being a rest or holding position.

If controller 20 has determined that HVAC actuator 10 may be too cold to operate optimally, controller 20 may operate motor 12 in one or more of several different manners to warm HVAC actuator 10. For example, and in some instances, controller 20 may provide a supplemental current component to motor 12 that is small enough to not substantially move HVAC component 16, but still generate heat within motor 12. A supplemental current component may, for example, be considered as being an amount of current being applied above and beyond any current already being applied to motor 12 to hold HVAC component 16 in a particular position. If HVAC component 16 is in a rest position in which no current is otherwise provided to motor 12, the supplemental current component may be the only current applied to motor 12. In some instances, and when the motor 12 has multiple commutation phases, controller 20 may control the motor 12 by locking onto a single phase so that the motor does not move, and then provide a supplemental current to the motor to heat the HVAC actuator. Also, and rather than providing a supplemental current component to the motor 12 itself, or in addition to providing a supplemental current component to the motor 12, it is contemplated that the controller 20 may provide a supplemental current component to other components (e.g. resistors, heating elements, etc.) of an HVAC actuator to warm the HVAC actuator, as desired.

In some instances, controller 20 may be programmed or otherwise configured to provide the supplemental current component to motor 12 only when HVAC component is not being driven open, driven closed and/or driven in either direction, but this is not required. In some cases, it will be appreciated that drive train 14 may permit small motor movement without transferring significant movement to HVAC component 16. Thus, motor 12 may be moved slightly without transferring significant movement to HVAC component 16. It will also be appreciated that HVAC component 16, whether an air damper or a ball valve, may move slightly without noticeably affecting the environment being heated, cooled or ventilated by HVAC component 16. For example, if HVAC component 16 is an air damper, the air damper may move slightly in a closing direction or an opening direction, or may oscillate between the two, without significantly affecting the air temperature within a conditioned space.

As shown in FIG. 2, HVAC component 16 may be considered as having a range of motion 34. The supplemental current component may, for example, cause HVAC component 16 to move a distance that corresponds to less than ten percent of the range of motion 34. In some cases, the supplemental current component may cause HVAC component 16 to move a distance that corresponds to less than five percent of the range of motion 34, less than three percent of the range of motion 34, or less than one percent of the range of motion 34. A similar analysis may be provided for range of motion of a linear actuator.

In some instances, the supplemental current component may cause motor 12 to oscillate about a particular position, alternately moving a small amount in a first direction followed by moving a small amount in a second direction. The first direction may correspond to an opening direction while the second direction may correspond to a closing direction, but this is not required. This movement may warm motor 12 without significantly or excessively moving HVAC component 16.

In some cases, as noted above, HVAC actuator 10 may include a bias mechanism 18 such as a return spring. When so provided, controller 20 may be configured to provide a first level of current to motor 12 that is required to hold HVAC component 16 at a selected position against the bias force provided by the return spring. The supplemental current component, if provided by controller 20, may be above and beyond the first level of current. In some cases, controller 20 may warm HVAC actuator 10 by providing a supplemental current component that includes a plurality of current pulses to the motor. With each current pulse, motor 12 may drive HVAC component 16 a short distance against the return spring and then allow HVAC component 16 to move a short opposite distance, driven by the return spring.

Figure 3:
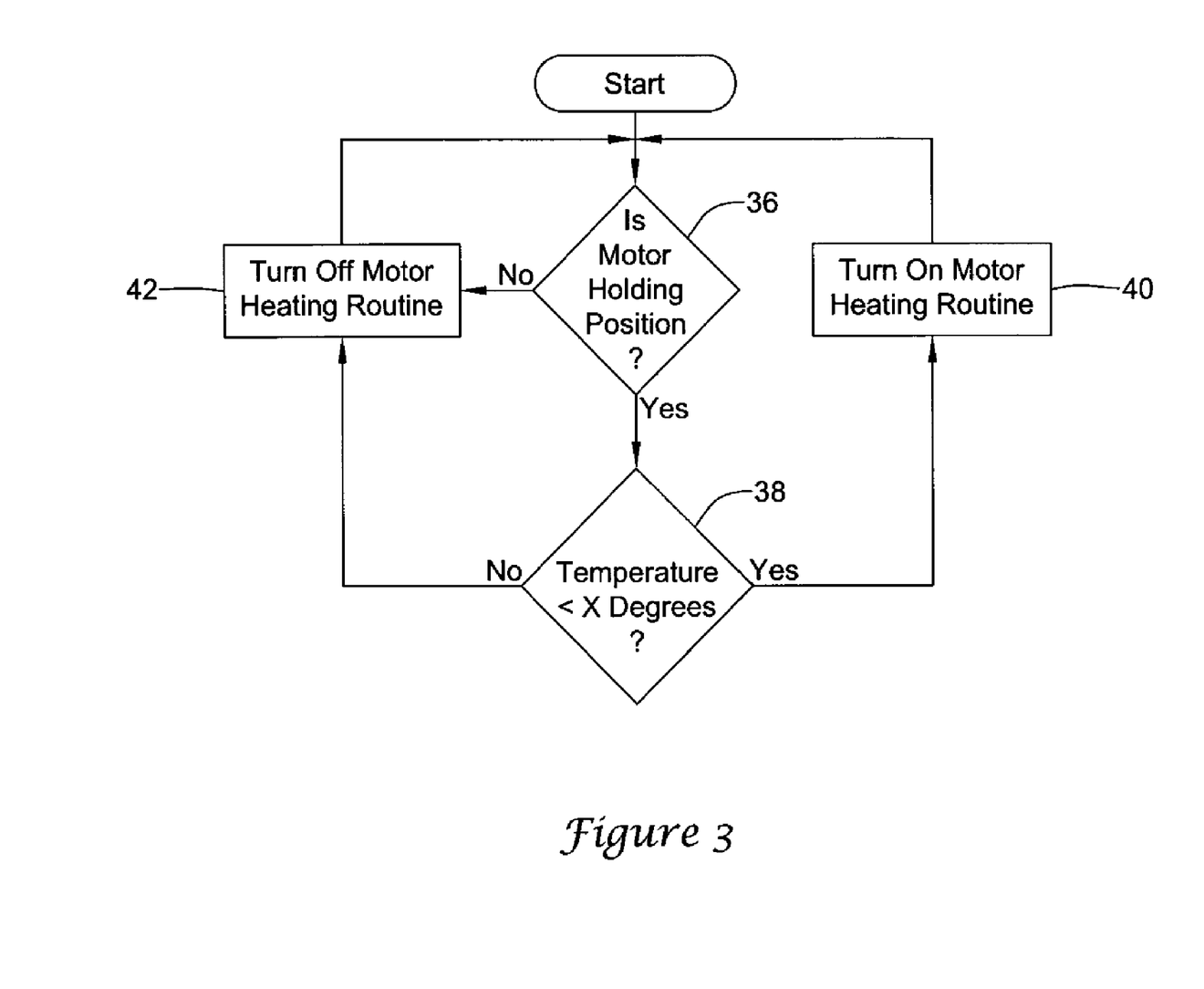
FIGS. 3 through 6 are flow diagrams showing illustrative but non-limiting examples of methods that may be carried out using the HVAC actuator of FIG. 1.

FIG. 3 is a flow diagram showing an illustrative but non-limiting example that may be carried out via HVAC actuator 10 (FIG. 1). In FIG. 3, control begins at decision block 36, where controller 20 (FIG. 1) determines if motor 12 (FIG. 1) is in a holding or rest position. This determination may, for example, be made as discussed above with respect to current draw and/or motor hall counts. In some cases, the controller 20 may itself know if the HVAC actuator 10 is expected to be in a holding position by, for example, knowing past commands that were issued to the motor 12. For example, if the controller 20 previously supplied current to the motor 12 to move the motor from a rest position to a hold position, the controller 20 may itself know that the HVAC actuator 10 should be in a holding position and therefore controller 20 will recognize that motor 12 is not actively moving HVAC component 16. As a result, controller 20 may determine that motor 12 is in a stationary position, and may undergo a motor heating routine as discussed below.

If motor 12 is in a holding or rest position, control passes to decision block 38. At decision block 38, controller 20 determines if HVAC actuator 10 is at a temperature that is below a selected temperature. If so, control passes to block 40 where controller 20 implements a motor heating routine such as one or more of those discussed above. Otherwise, control passes to block 42, where the motor heating routine is stopped. Returning briefly to decision block 36, if motor 12 is not in a holding position, control also passes to block 42, where the motor heating routine if initiated is stopped. It is important to note that while these method steps are described in a particular order, they do not necessarily follow in chronological order.

Figure 4:
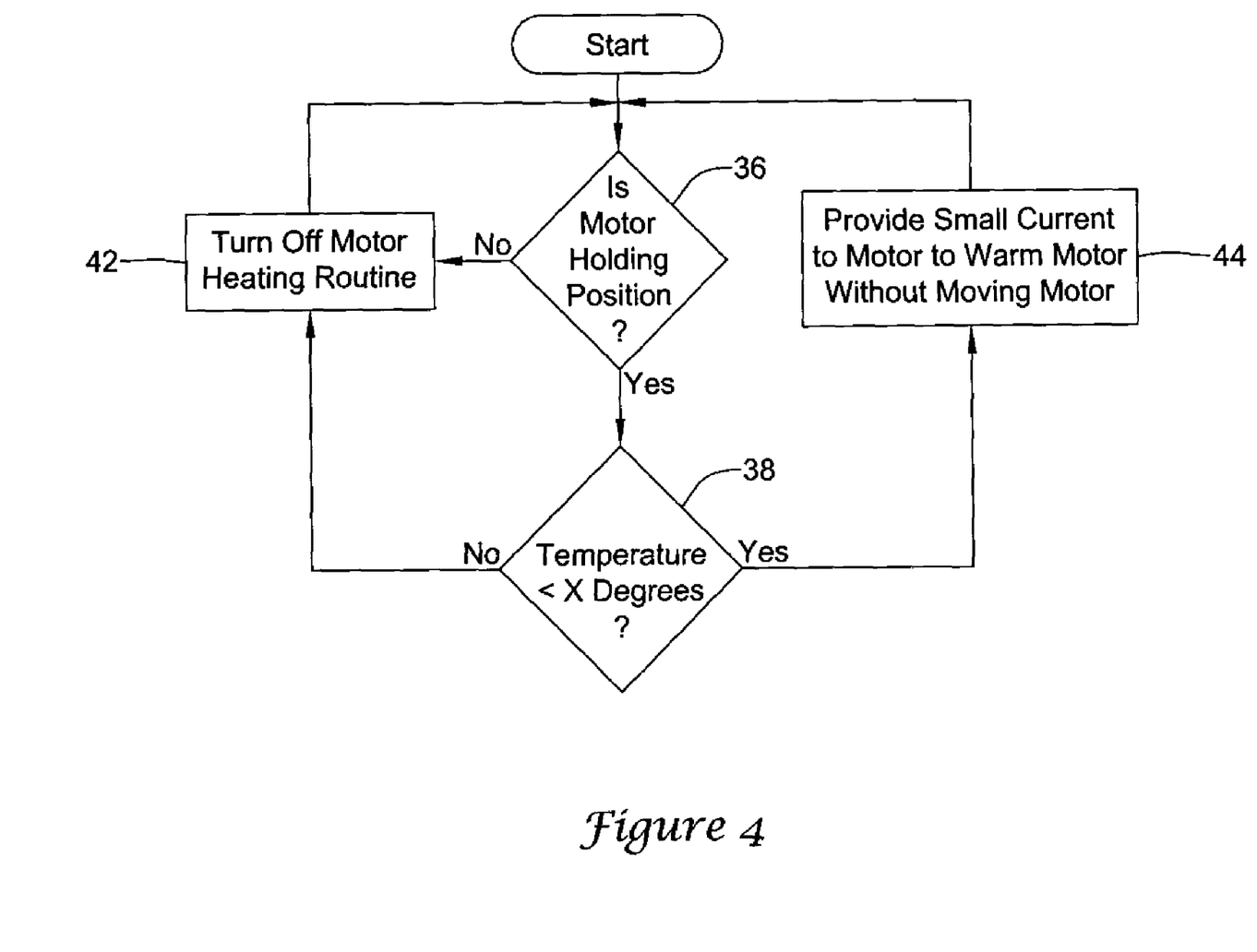

FIG. 4 is a flow diagram showing an illustrative but non-limiting example that may be carried out via HVAC actuator 10 (FIG. 1). In FIG. 4, control begins at decision block 36, where controller 20 (FIG. 1) determines if motor 12 (FIG. 1) is in a holding or rest position. If motor 12 is in a holding or rest position, control passes to decision block 38. At decision block 38, controller 20 determines if HVAC actuator 10 is at a temperature that is below a selected temperature. If so, control passes to block 44 where controller 20 provides a supplemental amount of current to motor 12 in order to warm motor 12 without moving or at least without substantially moving motor 12. Otherwise, control passes to block 42, where the motor heating routine is stopped. Returning briefly to decision block 36, if motor 12 is not in a holding or rest position control also passes to block 42, where the motor heating routine if initiated is stopped. It is important to note that while these method steps are described in a particular order, they do not necessarily follow in chronological order.

Figure 5:
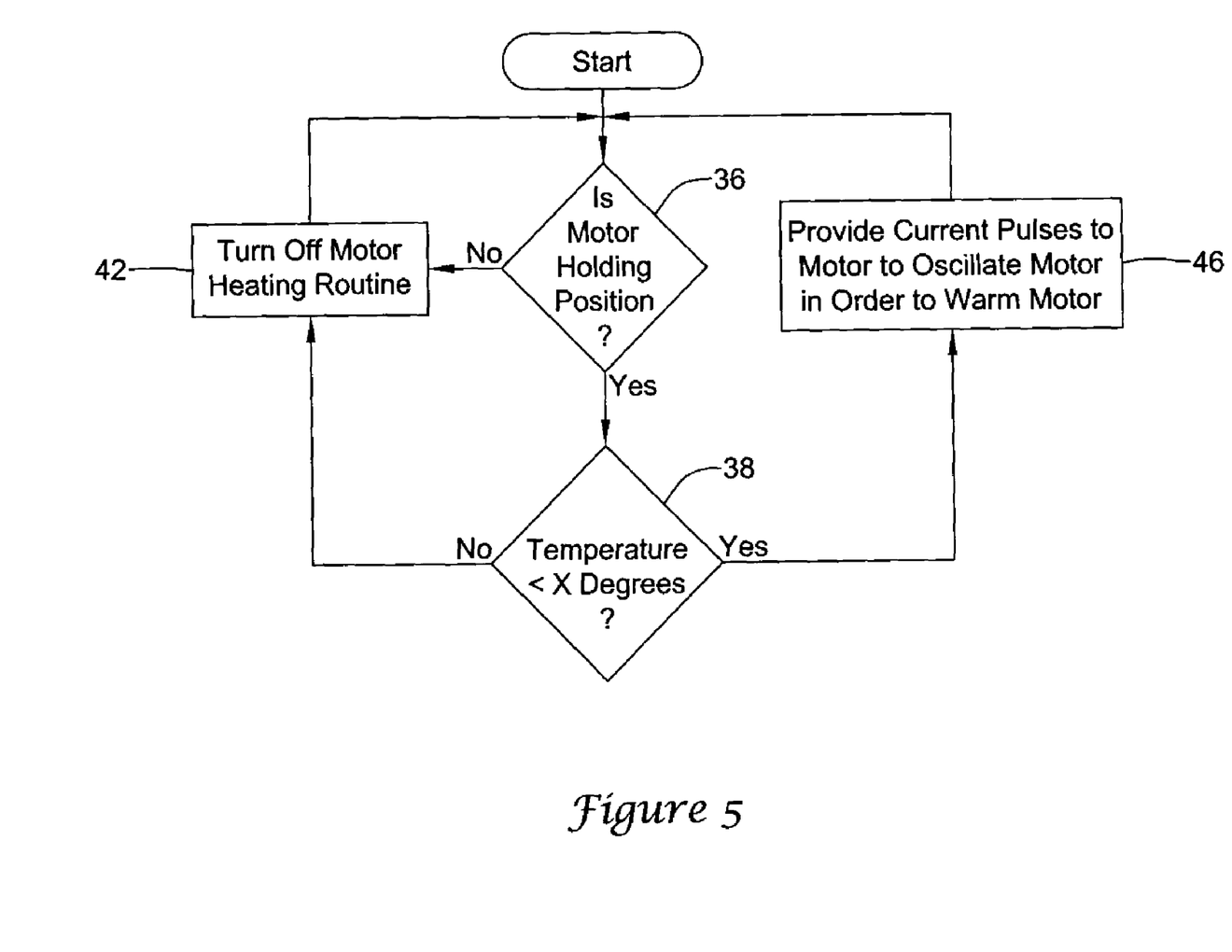

FIG. 5 is a flow diagram showing an illustrative but non-limiting example that may be carried out via HVAC actuator 10 (FIG. 1). In FIG. 5, control begins at decision block 36, where controller 20 (FIG. 1) determines if motor 12 (FIG. 1) is in a holding or rest position. If motor 12 is in a holding or rest position, control passes to decision block 38. At decision block 38, controller 20 determines if HVAC actuator 10 is at a temperature that is below a selected temperature. If so, control passes to block 46 where controller 20 provides a plurality of current pulses to motor 12 so that motor 12 will oscillate, thereby generating heat to warm HVAC actuator 10. In some cases, if HVAC actuator 10 includes a return spring, each current pulse may drive motor 12 a short direction against the return spring, followed by motor 12 being driven a short opposite direction by the return spring.

If controller 20 determines the HVAC actuator 10 is not at a temperature that is below a selected temperature, control passes to block 42, where the motor heating routine is stopped. Returning briefly to decision block 36, if motor 12 is not in a holding or rest position, control also passes to block 42, where the motor heating routine if initiated is stopped. It is important to note that while these method steps are described in a particular order, they do not necessarily follow in chronological order.

Figure 6:
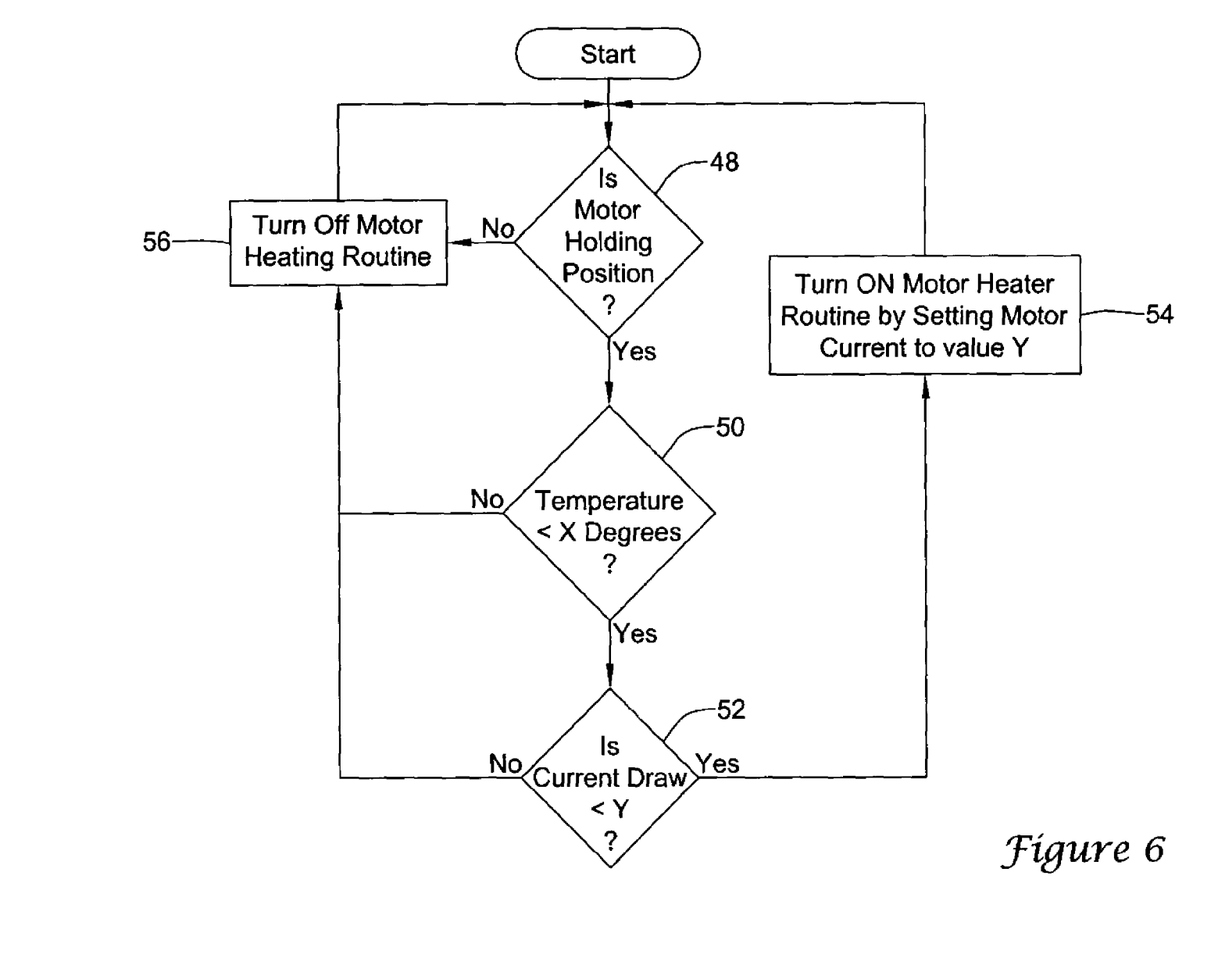

FIG. 6 is a flow diagram showing an illustrative but non-limiting example that may be carried out via HVAC actuator 10 (FIG. 1). Control begins at block 48, where controller 20 (FIG. 1) determines if motor 12 (FIG. 1) is in a holding or rest position. If so, control passes to decision block 50. Otherwise, control passes to block 56, where controller 20 halts the motor heating routine if initiated. At decision block 50, controller 20 determines if HVAC actuator 10 is below a predetermined temperature. If so, control passes to decision block 52. Otherwise, control reverts to block 56.

At decision block 52, controller 20 determines if motor 12 is drawing a current draw that is below a particular level Y. If not, which indicates that motor 12 may be moving, control reverts to block 56. If the current draw is below Y, control passes to block 54, where controller 20 activates a motor heating routine, and in some cases, sets the motor current equal to Y or some other current level, as desired, to produce additional heat in the HVAC actuator 10. It is important to note that while these method steps are described in a particular order, they do not necessarily follow in chronological order.

EXAMPLE

The following example is considered to be merely illustrative, and should not be construed as limiting the disclosure in any way. An HVAC actuator such as HVAC actuator 10 was tested to demonstrate the effectiveness of internal motor heating. Motor 12 was a brushless DC motor controlled via Pulse Width Modulation (PWM) and a multiphase DC commutation routine. In this example, when controller 20 is instructed to provide heating, motor commutation stops, locking motor 12 on a single phase. The current being applied to the motor 12 is then given by the following equation:

$$I = \frac{xV}{R},$$

where x is the PMW duty cycle, V is the PWM voltage, R is the resistance of the motor coils and I is the current running through the motor coils. In this example, x was set equal to 0.2 (20 percent duty cycle), V was set equal to 30 volts and R was determined to be 13.9 ohms. The result is an initial current draw of 0.44 amps through the motor. It will be appreciated that the current draw will fluctuate for several reasons. The current running through the motor coils will warm the motor coils, thereby increasing their resistance and consequently decreasing the amperage, assuming a constant voltage. Since the voltage may be load dependent, as more power is drawn by the motor, the voltage will tend to decrease and therefore the amperage running through the motor coils will also decrease.

Figure 7:
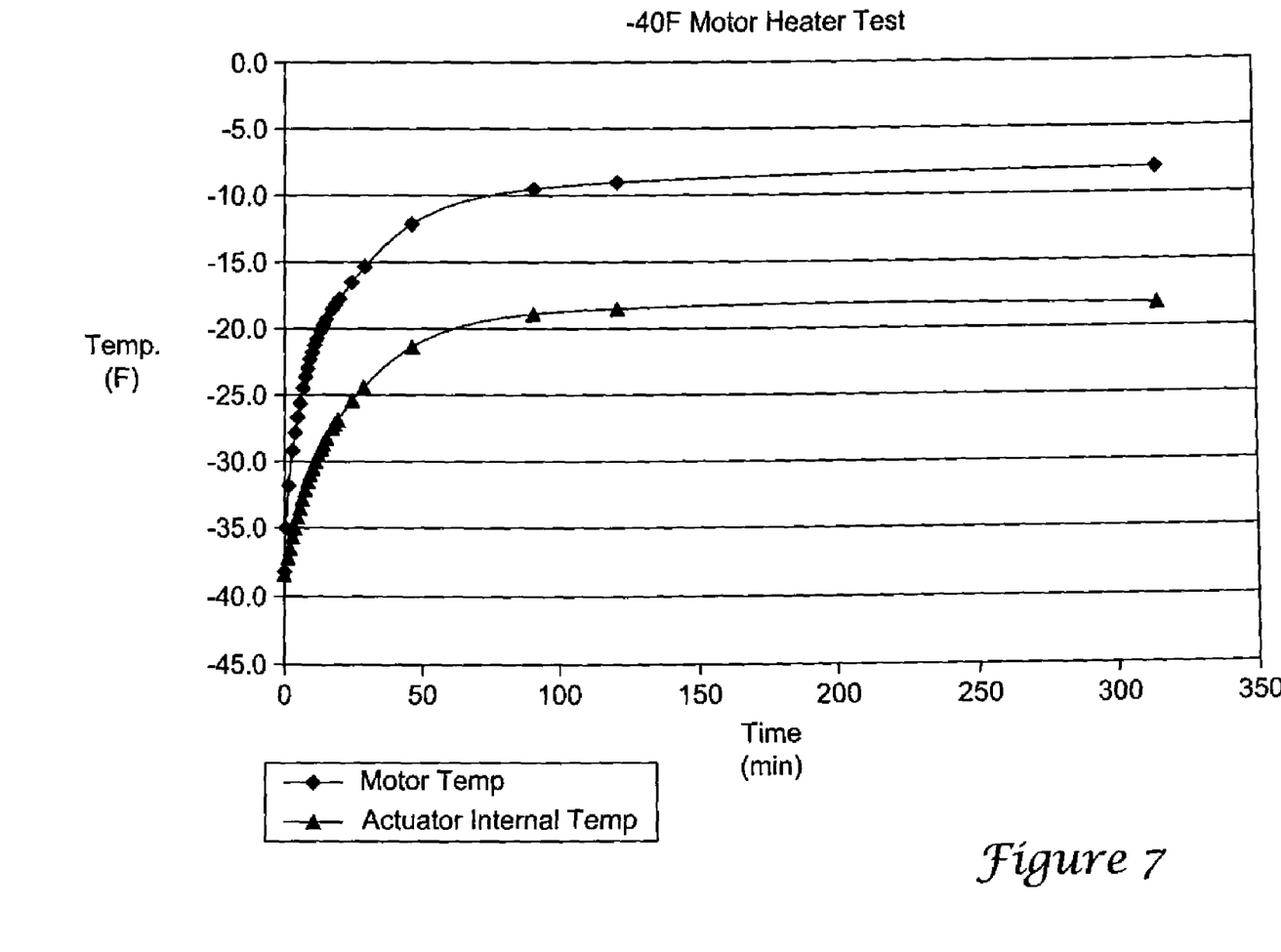
FIG. 7 is a graphical representation of experimental data.

The illustrative HVAC actuator 10 demonstrated admirable heating characteristics, as shown in FIG. 7. Initially, the environmental temperature was −40° F. It can be seen that starting temperatures of the motor itself and the actuator internal temperature were close to −40° F. Within about 2 hours, the motor temperature increased about 30° F. and the temperature within the actuator itself increased about 20° F. These increases in temperature greatly improve the spring return and driving performance of the actuator. With the internal heating demonstrated herein, the actuator is expected to consistently close in less than 60 seconds at an environmental temperature of −40° F. Without the internal heating demonstrated herein, an actuator is expected to spring close in a time that can range from 60 seconds to more than 500 seconds.

An HVAC actuator such as HVAC actuator 10 is typically labeled with a maximum power draw value. For a device such as that tested herein, the actuator may be labeled with a 7 VA maximum rating. For a new device operating at room temperature against rated load at the output and a maximum load from the biasing mechanism, the power consumption is about 5.5 VA. When the device is in holding mode, the power consumption is about 1.5 VA. During heating, the power consumption during holding mode was set to increase to about 5.5 VA to maximize heating while maintaining the nominal power rating.

The disclosure should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

What is claimed is:

1. An HVAC actuator for driving an HVAC component, comprising:

a drive train configured to drive the HVAC component along a range of motion from a first HVAC component position to a second HVAC component position;

a motor coupled to the drive train for driving the drive train and thus the HVAC component; and a controller for controlling the motor to move the HVAC component from the first HVAC component position to the second HVAC component position, the controller configured to detect a selected condition, and in response to detecting the selected condition, applying a supplemental current component to the motor, wherein the supplemental current component does not substantially move the HVAC component but warms the motor; and wherein the supplemental current component causes the motor to move in a first direction and then in a second direction, without substantially moving the HVAC component.

2. The HVAC actuator of claim 1, wherein the selected condition corresponds to a cold temperature condition.

3. The HVAC actuator of claim 2, wherein the controller is coupled to a temperature sensor, and the controller detects the cold temperature condition by monitoring an output of the temperature sensor.

4. The HVAC actuator of claim 1, wherein the supplemental current component causes the HVAC component to move less than 10 percent of the range of motion.

5. The HVAC actuator of claim 1, wherein the supplemental current component causes the HVAC component to move less than 5 percent of the range of motion.

6. The HVAC actuator of claim 1, wherein the supplemental current component causes the HVAC component to move less than 3 percent of the range of motion.

7. The HVAC actuator of claim 1, wherein the HVAC component comprises an air damper or a ball valve.

8. The HVAC actuator of claim 1, wherein the controller warms the motor by operating the motor inefficiently while the motor is driving the drive train.

9. The HVAC actuator of claim 1, further comprising a resistive heating element controllable by the controller in order to warm the motor.

10. An HVAC actuator for driving an HVAC component, comprising:

a drive train configured to drive the HVAC component along a range of motion from a first HVAC component position to a second HVAC component position;

a motor coupled to the drive train for driving the drive train and thus the HVAC component; and a controller for controlling the motor to move the HVAC component from the first HVAC component position to the second HVAC component position, the controller configured to detect a selected condition, and in response to detecting the selected condition, applying a supplemental current component to the motor, wherein the supplemental current component does not substantially move the HVAC component but warms the motor; and wherein the supplemental current component causes the HVAC component to move back and forth about an HVAC component position, wherein the back and forth movement of the HVAC component is less than 5 percent of the range of motion of the HVAC component.

11. The HVAC actuator of claim 10, further comprising a bias mechanism for providing a bias force that urges the HVAC component from the second HVAC component position to the first HVAC component position, the controller configured to provide a first level of current to the motor, wherein the first level of current is required to hold the HVAC component at a selected position against bias force of the bias mechanism.

12. The HVAC actuator of claim 11, wherein the bias mechanism comprises a resilient material.

13. The HVAC actuator of claim 11, wherein the bias mechanism comprises a return spring.

14. An HVAC actuator for driving an HVAC component, comprising:

a drive train configured to drive the HVAC component along a range of motion from a first HVAC component position to a second HVAC component position;

a motor coupled to the drive train for driving the drive train and thus the HVAC component;

a controller for controlling the motor to move the HVAC component from the first HVAC component position to the second HVAC component position, the controller configured to detect a selected condition, and in response to detecting the selected condition, applying a supplemental current component to the motor, wherein the supplemental current component does not substantially move the HVAC component but warms the motor;

a bias mechanism for providing a bias force that urges the HVAC component from the second HVAC component position to the first HVAC component position, the controller configured to provide a first level of current to the motor, wherein the first level of current is required to hold the HVAC component at a selected position against bias force of the bias mechanism and wherein the supplemental current component is above and beyond the first level of current.

15. An HVAC actuator for driving an HVAC component, comprising:

a drive train configured to drive the HVAC component along a range of motion from a first HVAC component position to a second HVAC component position;

a motor coupled to the drive train for driving the drive train and thus the HVAC component;

a controller for controlling the motor to move the HVAC component from the first HVAC component position to the second HVAC component position, the controller configured to detect a selected condition, and in response to detecting the selected condition, applying a supplemental current component to the motor, wherein the supplemental current component does not substantially move the HVAC component but warms the motor;

a bias mechanism for providing a bias force that urges the HVAC component from the second HVAC component position to the first HVAC component position, the controller configured to provide a first level of current to the motor, wherein the first level of current is required to hold the HVAC component at a selected position against bias force of the bias mechanism and wherein the supplemental current component includes a plurality of current pulses to the motor such that the motor will with each current pulse drive the HVAC component a short distance against the bias mechanism and then allow the HVAC component to move a short opposite distance driven by the bias mechanism.

16. An HVAC actuator for driving an HVAC component, comprising:

a drive train configured to drive the HVAC component along a range of motion from a first HVAC component position to a second HVAC component position;

a motor coupled to the drive train for driving the drive train and thus the HVAC component; and a controller for controlling the motor to move the HVAC component from the first HVAC component position to the second HVAC component position, the controller configured to detect a selected condition, and in response to detecting the selected condition, applying a supplemental current component to the motor, wherein the supplemental current component does not substantially move the HVAC component but warms the motor; and wherein the motor is a brushless DC motor with PWM control, and the controller warms the motor by locking onto a single phase.

17. A spring return HVAC actuator for driving an HVAC component, comprising:
a motor;
a drive train driven by the motor, the drive train configured to drive the HVAC component in a first direction toward a first HVAC component position along a range of motion;
a return spring configured to drive the HVAC component in a second, opposing direction;
a controller configured to operate the motor in order to drive the HVAC component in the first direction; and
a thermal monitor that detects an HVAC actuator temperature of the HVAC actuator and provides the controller with a signal representing the HVAC actuator temperature;
wherein the controller is also configured to apply a supplemental current component to the motor if the HVAC actuator temperature is too low in order to warm the spring return HVAC actuator, wherein the supplemental current component does not substantially move the HVAC component.

18. The spring return HVAC actuator of claim 17, wherein the controller is configured to apply the supplemental current component to the motor only when the controller is not driving the HVAC component in the first direction toward the first HVAC component position.

19. The spring return HVAC actuator of claim 17, wherein the controller will, if the HVAC actuator temperature is too low, provide a current pulse to the motor that is sufficient to slightly move the motor but not substantially move the HVAC component.

20. The spring return HVAC actuator of claim 17, wherein the supplemental current component does not move the HVAC component more than 5 percent of the range of motion of the HVAC component.

21. The spring return HVAC actuator of claim 17, wherein the controller will, if the HVAC actuator temperature is too low, provide a plurality of current pulses to the motor such that the motor will with each current pulse drive the drive train a short distance against the return spring and then allow the drive train to move a short opposite distance driven by the return spring.

22. An HVAC actuator for driving an HVAC component, comprising:
a motor;
a drive train driven by the motor, the drive train being configured to drive the HVAC component; and
a controller configured to operate the motor in order to drive the HVAC component in a first direction to open the HVAC component and a second direction to close the HVAC component along a range of motion; and
a thermal monitor that detects a temperature of the HVAC actuator and provides the controller with a signal representing the HVAC actuator temperature;
wherein the controller is also configured to actuate the motor without substantially moving the HVAC component if the HVAC actuator temperature is too low in order to warm the spring return HVAC actuator.

23. The HVAC actuator of claim 22, wherein the controller is configured to actuate the motor in order to increase the HVAC actuator temperature only when the motor is not driving the HVAC component open or closed.

24. The HVAC actuator of claim 22, wherein if the HVAC actuator temperature is too low, the controller actuate the motor without moving the HVAC component by more than 5 percent of the range of motion of the HVAC component.

* * * * *